United States Patent [19]

Struger et al.

[11] 4,302,820

[45] Nov. 24, 1981

[54] DUAL LANGUAGE PROGRAMMABLE CONTROLLER

[75] Inventors: Odo J. Struger, Chagrin Falls; Ronald E. Schultz, Willoughby, both of Ohio; Barry E. Sammons, Whitefish Bay, Wis.

[73] Assignee: Allen-Bradley Company, Milwaukee, Wis.

[21] Appl. No.: 67,798

[22] Filed: Aug. 20, 1979

[51] Int. Cl.³ .......................... G05B 19/02; G06F 9/06
[52] U.S. Cl. .................................................. 364/900
[58] Field of Search ... 364/200 MS File, 900 MS File, 364/104, 107

[56] References Cited

U.S. PATENT DOCUMENTS 4,165,534  8/1979  Dummermuth et al. ........... 364/900
4,215,399  7/1980  Pavicic et al. .................. 364/200 X

*Primary Examiner*—Raulfe B. Zache
*Attorney, Agent, or Firm*—Quarles & Brady

[57] ABSTRACT

A programmable controller includes a microprocessor which operates in response to machine instructions stored in a read-only memory. A control program comprised of programmable controller-type instructions is stored in a random access memory. These are executed by translating their operation codes into the starting addresses of corresponding sets of machine instructions. In addition, one or more "universal instructions" may be contained in the control program, and when these are read from the random-access memory, they are translated to enable the microprocessor to execute a user defined set of microprocessor machine instructions. These user defined machine instructions may be stored in a read-only memory or they may be stored in the random access memory with the control program. The programmable controller may thus effectively be programmed in two languages, a programmable controller language and a microprocessor machine language.

11 Claims, 12 Drawing Figures

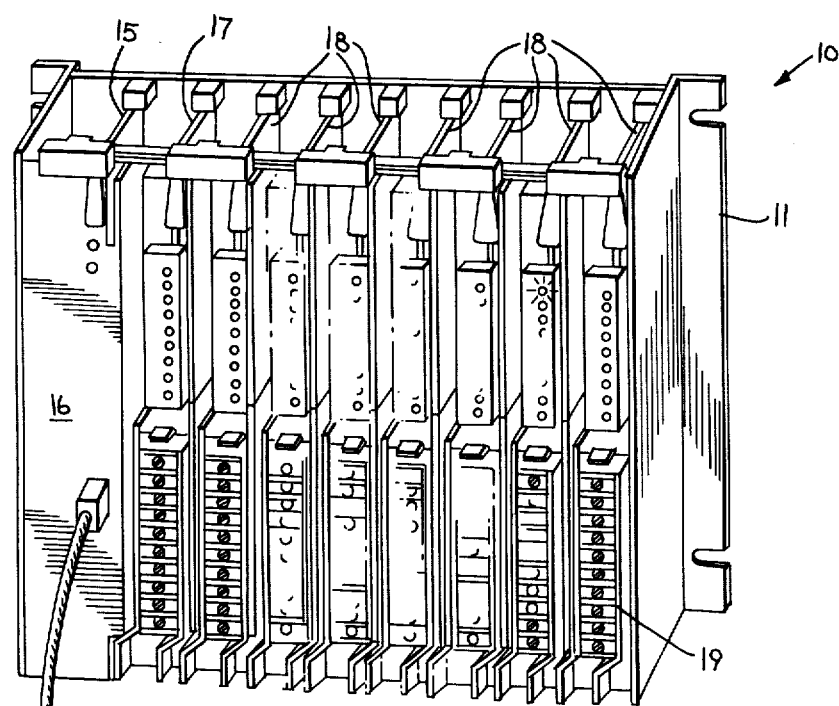
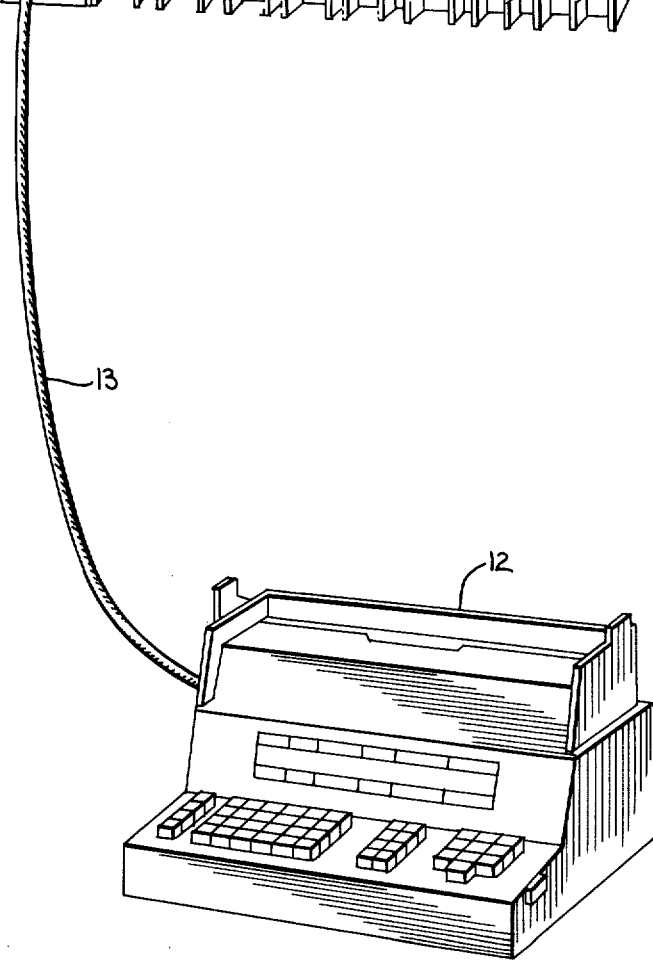
Fig. 1

Fig. 7
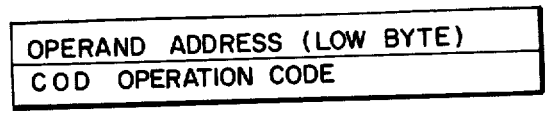
Fig. 8
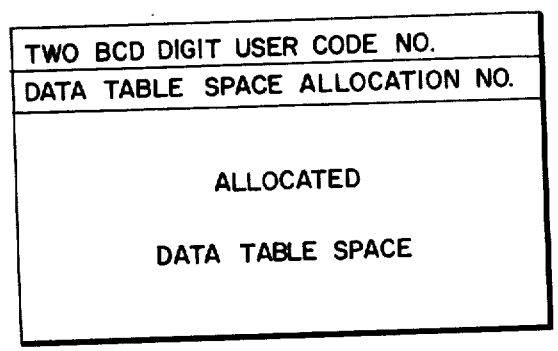
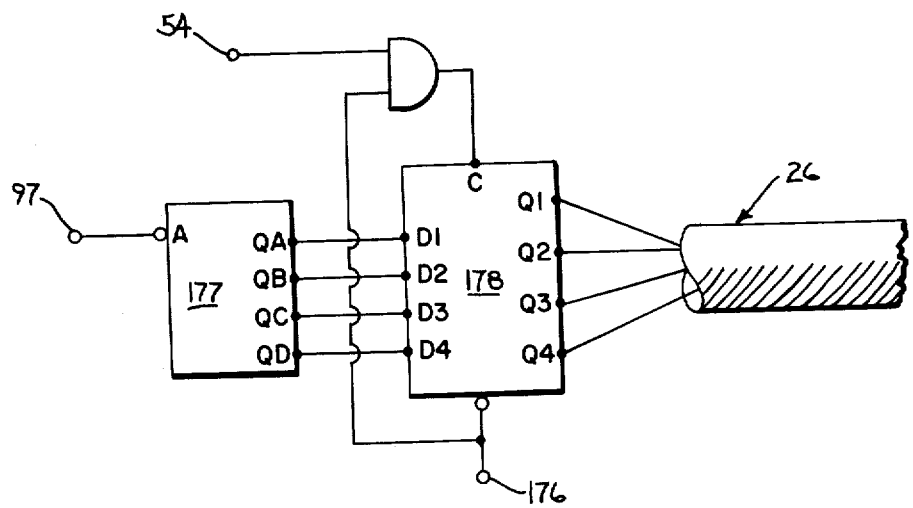
Fig. 11

DUAL LANGUAGE PROGRAMMABLE CONTROLLER

BACKGROUND OF THE INVENTION

The field of the invention is programmable controllers, and particularly, microprocessor-based programmable controllers such as those disclosed in U.S. Pat. No. 4,165,534 entitled "Digital Control System with Boolean Processor," and co-pending U.S. patent application Ser. No. 43,897 entitled "Mini-Programmable Controller," and Ser. No. 026,012 entitled "Microprogrammed Programmable Controller."

Since their inception, programmable controllers have been clearly distinguishable from other programmable processors by their instruction set which is tailored to meet the specific needs of the control engineer. This instruction set provides a language which is easily understood and used by those who have heretofore designed systems of relays, switches and motors using ladder diagrams. Not only are programmable controller processors, such as those described above, designed to execute this special purpose instruction set, but program loaders such as those disclosed in U.S. Pat. Nos. 3,798,612; 3,813,649; and 4,070,702 have been developed to facilitate the loading and editing of control programs using this instruction set.

Microprocessor-based programmable controllers employ processor circuits which are available commercially in integrated circuit form. Such well known microprocessors as the Intel 8008 and 8080, the Zilog Z-80, the Motorola 6800 and the Advanced Micro Devices Am2910 are examples of a few of such circuits. These microprocessors each have their own particular instruction set which is characterized by its general applicability to a wide variety of data processing uses. When such a microprocessor is used in a programmable controller, therefore, the control program which is comprised of programmable controller-type instructions must be converted, or translated, into the machine language of the particular microprocessor which is used.

The use of microprocessors and knowledge of their programming languages has become widespread in recent years. As a result, larger numbers of programmable controller users have developed the capability of employing microprocessors to solve special control problems which may be outside the scope of not only programmable controllers, but other commercially available control systems. On the other hand, users who do not have such capability make continuous demands upon the manufacturers of programmable controllers to expand their instruction sets to enable them to more readily solve their special control problems. Where the control problem is unique to only a few users, the expansion of the instruction set usually cannot be justified in prior programmable controllers and the user is left to his own resources.

SUMMARY OF THE INVENTION

The present invention relates to a programmable controller which is constructed to operate not only in response to a set of programmable controller-type instructions, but also, to operate in response to a newly defined instruction (COD) to execute a set of microprocessor machine instructions which carry out functions outside the usual scope of operation of the programmable controller instruction set. These microprocessor machine instructions may carry out nearly any specific control function and the COD instruction may, therefore, be viewed as a "universal instruction."

More specifically, the present invention is a programmable controller which includes a memory that stores a control program containing control instructions each having an operation code which defines a specific fixed function to be performed and containing at least one universal instruction. A processor sequentially executes the control program by performing the functions indicated by the operation code in each control instruction and it includes a microprocessor which executes machine instructions. A machine language routine is stored and the processor enables the microprocessor to execute the machine language routine when it reads the universal instruction from the memory during the execution of the control program.

It is a general object of the invention to enable a selected machine language routine to be executed as part of the control program to carry out special functions outside the scope of the fixed programmable controller instruction set. The universal instruction operation code directs the processor to execute a machine language routine and an accompanying user code in the universal instruction identifies which one of many such stored routines is to be executed by the microprocessor. More than one machine language routine may thus be executed during a single scan through the control program or the same routine may be executed many times during a single scan.

It is another object of the invention to enable users of programmable controllers to write and load their own machine language routines and to control the execution of such routines through the control program. The machine language routines can be written into read-only memories and plugged into designated sockets in the programmable controller. The location, or starting address, of each such routine is stored in a jump table and the user code in the universal instruction is employed by the processor to read the starting address of the corresponding machine language routine out of the jump table. In addition, a real time clock is employed to record the time it takes to execute the control program, and an indication of this scan time is made available to the user so that the impact of any changes in a machine language routine can be immediately determined.

A more specific object of the invention is to enable the machine language routine to be stored in the same memory with the control program. This is accomplished by using designated user codes in the universal instruction which indicate to the processor that the machine language routine to be executed is located in a designated portion of the control program memory.

Another specific object of the invention is to enable the microprocessor to execute both the control instructions and the machine language routines. The control instruction operation codes are mapped into corresponding interpreter routines which are stored in a read-only memory and which are comprised of machine instructions that are executed by the microprocessor to carry out a defined function. In carrying out these functions defined by the programmable controller instruction set certain registers inside the microprocessor are dedicated to special purposes. Therefore, before the machine language routines called for by the universal instruction can be executed, the contents of these registers must be saved. Similarly, the contents of the dedicated registers are restored before returning to the execution of the control program instructions.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 1 is a perspective view of a programmable controller that incorporates the present invention;

FIGS. 7 and 8 are schematic representations of the COD instruction format and corresponding data table contents;

FIG. 11 is a real time clock circuit used to determine control program scan time.

DESCRIPTION OF THE PREFERRED EMBODIMENT

Figure 2:
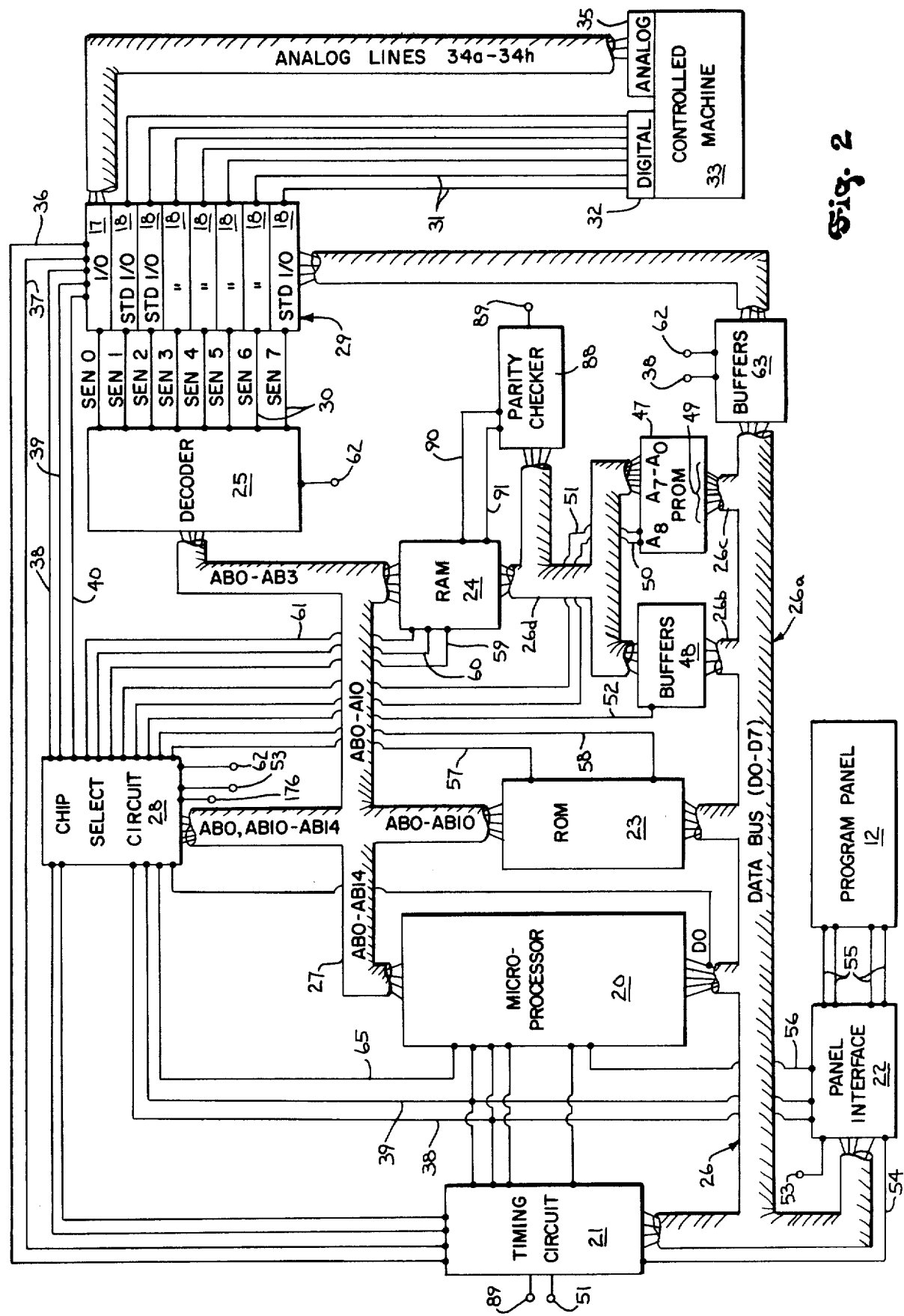
FIG. 2 is a block diagram of the programmable controller of FIG. 1.

Referring to FIG. 1, a programmable controller 10 is housed in a rack enclosure 11 and a detachable program panel 12 is connected through a communication cable 13 to a connector (hidden from view) on the front of the controller 10. The program panel 12 is employed by the user to enter and edit a control program into the programmable controller, and when this function is completed, it is unplugged from the controller 10 for storage or use with other programmable controllers.

The rack enclosure 11 holds a plurality of modules, which are printed circuit boards having various components, including integrated circuit "chips." The modules are held in upright, closely spaced and substantially parallel position in the enclosure 11. On the far left is a processor board 15 which has a processor daughter board 1 (not shown) mounted piggyback on it to form a processor module 16. To the right of the processor module 16 are a plurality of I/O modules, including an analog input, high density I/O module 17 and seven standard I/O modules 18. The input/output control capacity of the programmable controller can be increased or decreased by adjusting the size of the rack enclosure 11 to hold a different number of I/O modules 17 and 18. The mix of high density and standard I/O modules 17 and 18 is also optional.

Connections between modules in the rack enclosure 11 are made through a hard-wired back plane (not shown in FIG. 1) on the back of the rack enclosure 11. Connections to sensing devices and operating devices on the machine being controlled are made through swing-arm connectors 19 on the front of the enclosure 11. Further information on the construction of the rack enclosure 11 is provided in U.S. Pat. No. 4,151,580 which issued on Apr. 24, 1979.

Referring to FIG. 2, the processor module 16 includes a main microprocessor 20, a timing circuit 21, a program panel interface circuit 22, a read-only memory (ROM) 23, a random access memory (RAM) 24 and a decoder circuit 25 that are interconnected through eight lines, D0–D7, of an eight-bit data bus 26. The microprocessor 20 is also connected through lines AB-0–AB14 of a fifteen-bit address bus 27 to the memories 23 and 24 and to a chip select circuit 28. Signals on lines AB0 and AB10–AB14 are decoded by the chip select circuit 28 to selectively enable the elements of the processor module 16. The microprocessor 20 is also connected through lines AB0–AB3 of the address bus 27 to the decoder circuit 25. Signals on these lines are decoded by the decoder circuit 25 to selectively enable the I/O modules 17 and 18 in the I/O interface section 29. Each of these I/O modules 17 and 18 is connected through a slot enable line (SEN 0–SEN 7) 30 to the decoder 25 to receive the enabling signals.

The I/O modules 17 and 18 are connected to the data bus 26 to receive 8-bit bytes of data when enabled through a respective slot enable line 30. The standard I/O modules 18 are connected by lines 31 (only some of which are shown in FIG. 2) to single-bit digital devices 32 on a controlled machine 33. A standard I/O module 18 can be an input module that is connected to eight single-bit sensing devices, such as photocells or limit switches, or it can be an output module that is connected to eight single-bit output devices, such as solenoids or motor starters. The analog input high density module 17 is connected through eight analog signal lines 34a–34h to eight analog input devices 35, such as temperature and pressure sensors, on the controlled machine. The analog input module 17 is also connected through the backplane to a strobe line 36 and an I/O reset line 37 coming from the timing circuit 21, and to a read line 38, a write line 39 and a high density ID line 40 coming from the chip select circuit 28. Through the high density ID line 40 the main microprocessor 20 identifies an I/O module as a high density module during an I/O scan. For a more complete description of the structure and operation of the high density module 17, reference is made to copending U.S. patent application Ser. No. 43,886 filed on May 30, 1979 and entitled "Programmable Controller with High Density I/O Interface."

Figure 6:
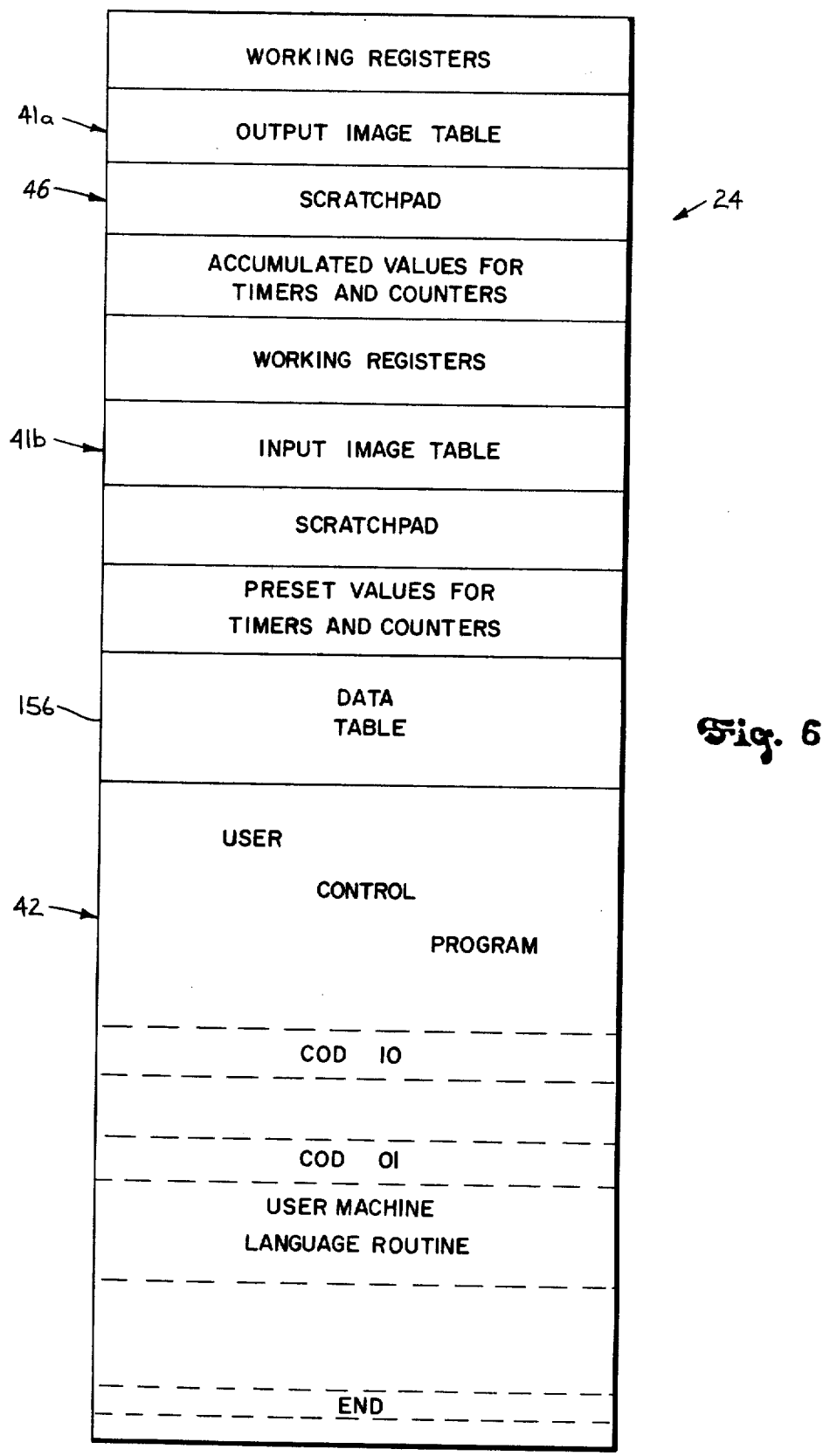
FIG. 6 is a memory map diagram of the contents of the RAM memory in FIG. 2.

As in several prior controllers, input status data and output status data are coupled between the RAM 24 and the I/O modules 17 and 18 during a program controlled I/O scan. Input status data represents the condition of digital and analog sensing devices 32 and 35, while output status data will operate digital output devices 32. Referring particularly to FIGS. 2 and 6, during each I/O scan, input status data is coupled to an input image table 41b stored in the RAM 24. This data is examined by program instructions in the user control program 42, which is also stored in the RAM 24. During execution of the control program 42, output status data is generated and this data is stored in an output image table 41a for coupling to output modules during the next I/O scan.

Most of the control program instructions stored in the RAM 24 are instructions that are familiar to users of programmable controllers. These instructions have been developed with the art into a relatively standard set of program instructions. These instructions perform operations which are identified by mnemonics such as XIC, XIO, BST, BND, GET, PUT and TON 0.1, to name a few. These instructions are not directly recognized by microprocessors, because each microprocessor has its own instruction set devised by its respective manufacturer. Consequently, each control instruction in the user control program 42 must be converted to microprocessor machine language for its execution. For a more complete description of the control program instruction set, reference is made to U.S. Pat. No. 3,942,158 and for a more complete description of the manner in which these control instructions are converted to microprocessor machine language for execution, reference is made to copending U.S. patent application Ser. No. 43,897, filed on May 30, 1979 and entitled "Mini-Programmable Controller." In the preferred embodiment, the microprocessor 20 is a Z80A microprocessor available from Zilog, Inc. and for a description of its instruction set as well as a description of its architecture and operation, reference is made to the "Z80-CPU Technical Manual," copyright 1976 by Zilog, Inc.

The I/O image table 41a and 41b and the control program 42 of FIG. 6 are stored in a read/write RAM memory 24 of FIG. 2, so that the I/O image table and program instructions can be easily updated and revised. Machine instructions for the microprocessor 20, on the other hand, are not ordinarily altered and nonvolatile storage of such instructions is desirable. Therefore, microprocessor machine instructions are stored in the ROM 23, which has a capacity for storing 6 K of 8-bit bytes of data.

Figure 5:
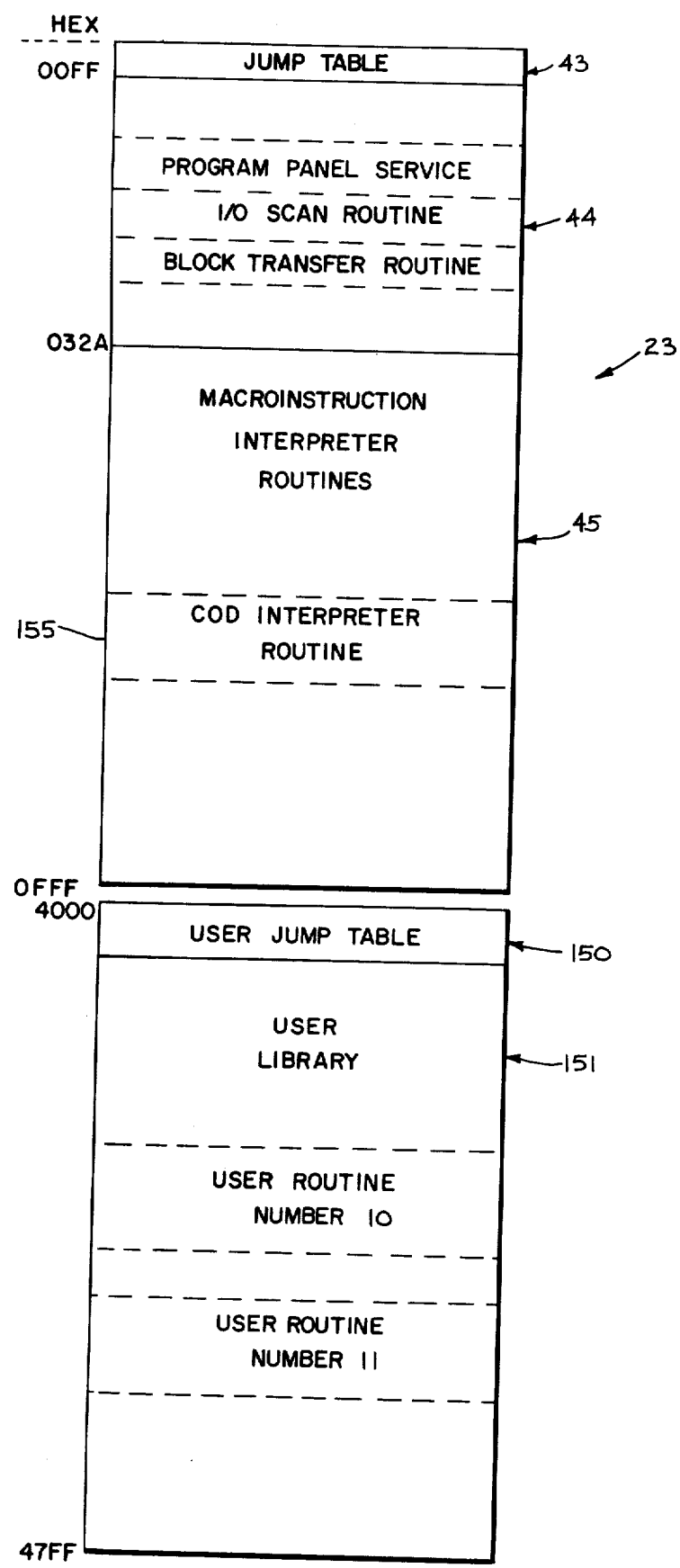
FIG. 5 is a memory map diagram of the organization of the ROM memory in FIG. 2.

The organization of the ROM 23 is seen in FIG. 5. A jump table 43 is stored in the lowest address lines of the ROM 23, followed by a group of firmware routines 44. The firmware routines 44 include an I/O scan routine, a program panel service routine and a block transfer routine. Following the basic firmware routines 44 are a group of macroinstruction interpreter routines 45, which are stored in the higher address lines in the ROM 23. Each of these routines corresponds to a distinct operation code in the set of control instructions, or macroinstructions, used to develop the control program 42 stored in the RAM 24. Each macroinstruction in the control program 42 is linked to one of the interpreter routines 45 in the ROM 23, as will be explained in detail below.

A portion of the programmable controller address space is reserved for a user jump table 150 and a user library 151. This portion of the ROM 23 may vary considerably in size depending on the length and number of user routines stored in the library 151. That portion of the ROM 23 which stores the user jump table 150 and the user library 151 may also be positioned physically in a location which is more readily available to the user so that he may easily plug in the integrated circuit memory chips containing his programs after they have been separately programmed.

To read a control program instruction, the main microprocessor 20 executes a FETCH routine comprised of microprocessor machine instructions. Most of the control program instructions include both a nine-bit operand address and a seven-bit operation code which are stored on even and odd lines, respectively, in the RAM 24. These are loaded into internal registers in the microprocessor 20 during the FETCH routine and the microprocessor 20 then jumps to the interpreter routine corresponding to the operation code. The operation code is, in fact, an address in the jump table 43 which is stored in the ROM 23. Or in other words, the jump table 43 contains statements for jumping to the address of the first instruction in the interpreter routine that corresponds to the operation code. The last portion of each interpreter routine includes the FETCH routine, which is executed to fetch the next control program macroinstruction.

TABLE 1

| FETCH ROUTINE | |
|---|---|
| Instruction Mnemonic | Comment |
| POP HL | Get next instruction; store the operand address in the L register; and store the operation code in the H register. |
| LD E,L | Load operand address (the low byte of the control program instruction) into the E register. |
| LD L,H | Form the address in HL which specifies a location in the jump table 43 in the ROM 23. |
| LD H,C | |
| JP (HL) | Jump indirect to the interpreter routine via the jump table 43 in the ROM 23. |

The main microprocessor 20 makes use of a number of internal registers in executing the FETCH routine and the other routines described herein. These registers include:

PC—a 16-bit program counter
SP—a 16-bit stack pointer
B&C—two 8-bit registers arranged as a pair
D&E—two 8-bit registers arranged as a pair
H&L—two 8-bit registers arranged as a pair.

The program counter PC stores the memory address of the current microprocessor machine instruction to be read from the ROM 23 while the stack pointer SP is employed to store the memory address of the next control macroinstruction to be read from the RAM 24. The stack pointer SP is initialized to point at the first control instruction in the control program 42, and it is incremented each time the FETCH routine is executed to sequentially address each sixteen-bit control program instruction. When the entire control program 42 has thus been scanned and the I/O scan performed, the stack pointer SP is reset to the beginning of the control program 42 and the scan is repeated.

The "standard" set of programmable controller instructions includes bit-oriented instructions, logic instructions, and word-oriented instructions. Bit-oriented instructions are employed to manipulate single bits of data and each of these instructions has a four-bit operation code and a three-bit pointer code that are together coupled through the jump table 43 to a respective interpreter routine. A typical interpreter routine for XIC2 is given in Table 2. This interpreter routine examines bit 2 of an input status byte in the I/O image table 41a and 41b. Bit 2 in this instance may represent the status (i.e., opened or closed) of a switch on the controlled machine 33.

TABLE 2

| XIC2 INTERPRETER ROUTINE | |
|---|---|
| Instruction Mnemonic | Comment |
| LD A, (DE) | Load indicated byte from I/O image table in the A register. |
| BIT 2,A | Test the specified bit in this byte. |

TABLE 2-continued

| XIC2 INTERPRETER ROUTINE | |
| --- | --- |
| Instruction Mnemonic | Comment |
| Jr NZ,FETCH | Jump to fetch next macroinstruction if bit 2 equals 1 (which represents closed contacts). |
| RES O,B | Reset rung status in B register if bit 2 equals O (which represents open contacts). |
| FETCH: | |

In addition to bit-oriented controller instructions there are logic instructions and word-oriented instructions. A BST instruction, for example, is a logic instruction which directs the controller to begin a new branch on a ladder diagram of the type well known in the art. Its interpreter routine performs this logical function by setting a bit in the microprocessor B register which is used to store rung and branch conditions. It should be apparent that during the execution of conventional programmable controller instructions the microprocessor B register and stack pointer are dedicated to specific functions.

Examples of word-oriented instructions include arithmetic instructions and timer and counter instructions. A timer instruction such as TON 0.1 for example, compares an accumulated data word to a preset data word and determines whether a timer has "timed out." If it has, the output is turned on. Other word-oriented instructions are GET and PUT which exchange words of data between a scratch pad area 46 in the RAM 24 and the accumulator (A) register in the microprocessor 20.

The operation codes in the control program instructions in the RAM 24 have seven bits of coded data that cannot be mapped directly to the interpreter routines 45 during the FETCH program. Instead, the control program instructions in the RAM 24 use operation codes and bit pointer codes which are assigned by the program panel 12 when they are loaded. The use of such untranslated codes allows the program panel 12 to be used with other prior programmable controllers that recognize them. To convert these untranslated codes to operation codes and bit pointer codes which are recognized by the present programmable controller, a translator PROM 47 is used.

Referring particularly to FIG. 2, the translator PROM 47 is connected to the RAM 24 to receive at its address terminals all data read from the RAM 24. The data bus 26 is divided into a main branch 26a and a memory data input branch 26b and a memory data output branch 26c, both of which stem from the main branch 26a, and the latter two of which are coupled by a two-way branch 26d to the RAM 24. A set of buffers 48 connects the memory data input branch 26b to the two-way branch 26d, and the translator PROM 747 connects the two-way branch 26d to the memory data output branch 26c. The translator PROM 47 is a 512-line by eight-bit mask programmable read-only memory with nine address inputs, $A_8$–$A_0$, and eight data outputs 49. The upper address input $A_8$ is connected through a translating line 50 to the chip select circuit 28 and an enable input on the translator PROM 47 is connected by an enable line 51 to the chip select circuit 28. The lower eight address inputs $A_7$–$A_0$ of the translator PROM 47 are connected to the two-way branch 26d of the data bus 26, and the eight data outputs 49 on the translator PROM 47 are connected to the main branch 26a of the data bus 26.

The upper 256 lines of the translator PROM 47 each store an eight-bit pattern which is identical to that which is applied to the address terminals $A_7$–$A_0$ to read that line. As a result, when the address terminal $A_8$ is high, data read from the RAM 24 is effectively coupled through the PROM 47 without being translated. When the address terminal $A_8$ is low, untranslated operation codes stored in the RAM 24 are applied to the address terminals $A_7$–$A_0$ and corresponding translated operation codes are read out onto the data bus 26 from one of the lower 256 lines of the translator PROM 47. The address terminal $A_8$ is controlled by the chip select circuit 28 which drives it low when control program instruction operation codes are read from the RAM 24 and which drives it high when other data is read from the RAM 24.

The program instructions with untranslated codes are loaded into the RAM 24 through the program panel 12. The program panel 12 is connected to the interface 22 through a pair of two conductor transmission lines 55 and the program panel interface 22 is enabled through a CS USART line 53 which is driven by the chip select circuit 28. In addition, the interface 22 is connected through a two-megahertz clock line 54 to the timing circuit 21, and it is connected through the read and write control lines 38 and 39 to the microprocessor 20. When data is entered through the program panel 12, an interrupt signal is transmitted to the microprocessor 20 through an interrupt line 56, and a program panel service routine which is stored in the ROM 23 is executed to control communication between the program panel 12 and the RAM 24. Control program instructions and other data entered through the program panel 12 are written into the RAM 24 through the input buffers 48 which are enabled by the chip select circuit 28 through control line 52.

Figure 3:
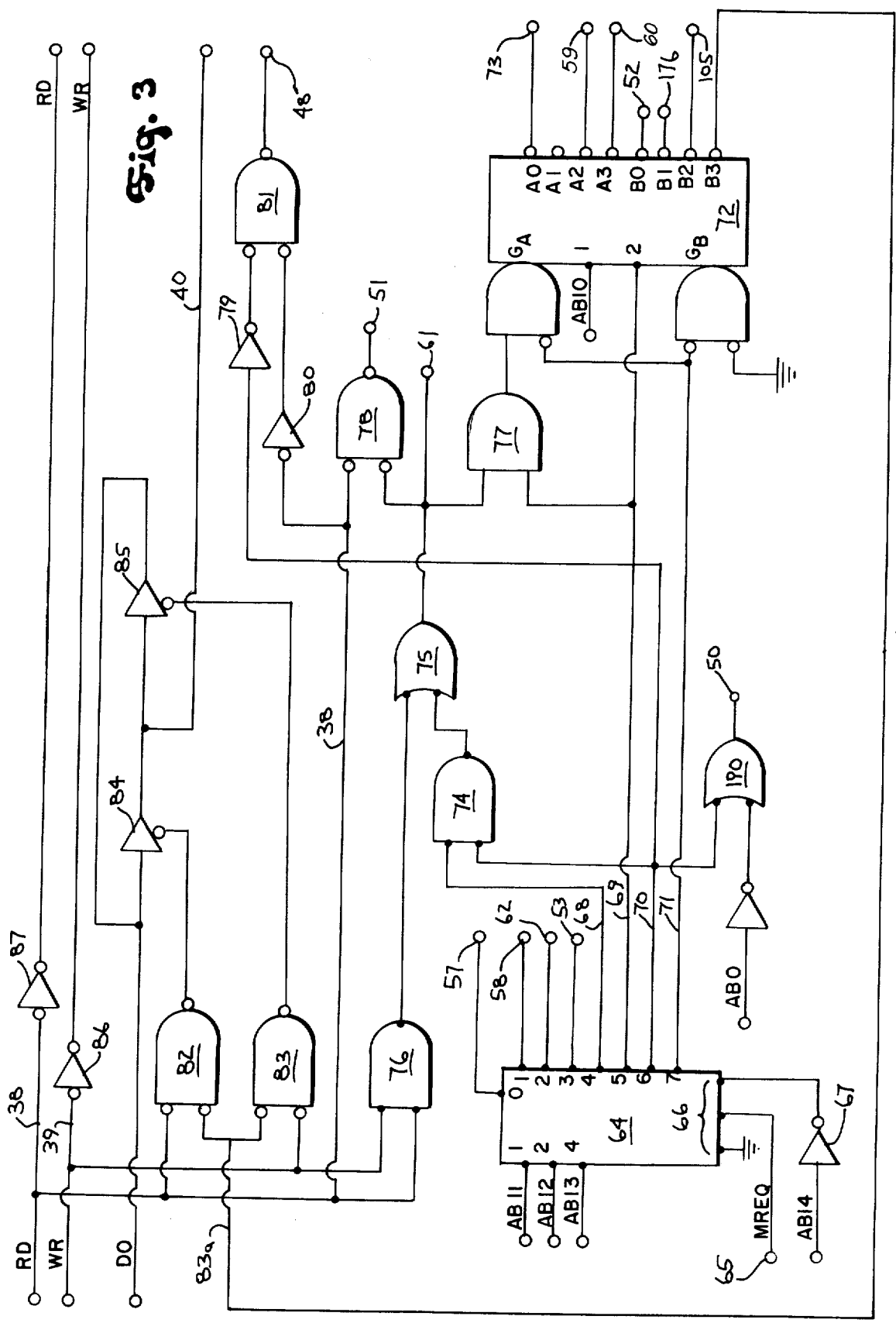
FIG. 3 is an electrical schematic diagram of the chip select circuit of FIG. 2.

In controlling the flow of data between the memories 23 and 24 and the I/O interface section 29, the microprocessor 20 is assisted by the timing circuit 21 and the chip select circuit 28. The chip select circuit 28 is driven by leads in the address bus 27 and it connects to the read and write control lines 38 and 39 and a memory request (MREQ) control line 65 which are driven by the microprocessor 20. As shown in FIG. 3, signals on lines AB11-AB13 of the address bus 27 are decoded by a three-line-to-eight-line decoder 64 in the chip select circuit 28. The memory request (MREQ) line 65 connects to one of the three enable inputs 66 on the decoder 64, a second enable input 66 is grounded, and the AB14 line is connected through an inverter 67 to the third enable input 66. Control lines 57 and 58 which enable the ROM 23 are connected to the "0" and "1" outputs of the decoder 64 and a control line 62 connects the "2" output on the decoder 64 to the decoder 25 and the buffers 63. The CS USART line 53 is connected to the "3" output and the remaining outputs "4"–"7" are further decoded to drive other elements of the programmable controller.

Outputs "4"–"7" on the decoder 64 are coupled through respective lines 68–71 to a dual two-to-four-line decoder 72 having gate enable inputs $G_A$ and $G_B$. Two other inputs "1" and "2" are coupled to one of two sets of outputs on the decoder 72, either $A_0$–$A_3$ or $B_0$–$B_3$, depending on which gate input $G_A$ or $G_B$ is enabled. The line 69 connects the three-to-eight-line decoder 64 to the "2" input on the two-to-four-line decoder 72, and when Gate $G_A$ is enabled, it generates an enabling signal on one of the RAM enable lines 59 and 60. A signal on the AB10 address line connected to the "1" input on the two-to-four-line decoder 72 selects which of these RAM enable lines 59 and 60 receives the enabling signal. The gate input $G_A$ also receives an enabling signal when a watchdog error or parity error is forced through a line 73 connected to the $A_0$ output on the decoder 72. The other gate $G_B$ receives an enabling signal on the line 71 when the processor status word address 14K is generated on the address bus 27.

The line 68 and the line 70 emanating from the decoder 64 are also coupled through several gates to control signals on the buffer enable line 48 and the translator PROM enable line 51. The line 68 and the line 70 are coupled through an AND gate 74 to an input on an OR gate 75 and the read and write control lines 38 and 39 are coupled through an AND gate 76 to another input on this OR gate 75. The output of the OR gate 75 drives a RAM enable line 61 and it and the control line 69 are coupled through another AND gate 77 to one of the dual inputs $G_A$. The output of the OR gate 75 and the read control line 38 are coupled through a low true AND gate 78 to the translator PROM enable line 51 and the control line 70 and the read control line 38 are coupled through inverters 79 and 80 to two inputs on another low true AND gate 81. The output of this AND gate 81 is connected to the buffer enable line 48.

The control line 70 and the AB0 address line are coupled through an OR gate 190 to control the translating control line 50. The address bus lead AB12 serves to enable the translator PROM 47 such that data read from odd numbered lines in the address range from 3000 to 3FFF (hexadecimal) are translated and all other data is untranslated.

The read and write lines 38 and 39 are, in addition, each coupled to an input on one of two low true AND gates 82 and 83, each of which has another input connected to the B3 output of the two-to-four-line decoder 72 through a line 83a. The outputs of these two AND gates 82 and 83 are connected to enable inputs on two other gates 84 and 85 which couple the D0 line to the module ID line 40. The read and write lines 38 and 39 are also connected through respective drivers 86 and 87 to outputs on the chip select circuit 28.

Other control circuitry is included in the timing circuit 21. The timing circuit 21 provides timing signals, senses parity and other communication errors, and controls the mode of operation of the controller. Actual parity error checking is performed by a parity checker 88, seen in FIG. 2. It is connected to branch 26d of the data bus 26 and it is also connected through a parity line 89 to the timing circuit 21. The parity checker receives a stored parity bit through a parity out line 90 when data is read from the RAM 24. The stored parity is compared with the parity calculated for data read out on the data bus 26. When data is read into the RAM 24, the parity checker 88 calculates its parity and transmits it to the proper storage location in the RAM 24 through a parity in line 91. Parity errors are reported to the timing circuit 21 through the parity line 89.

Figure 4:
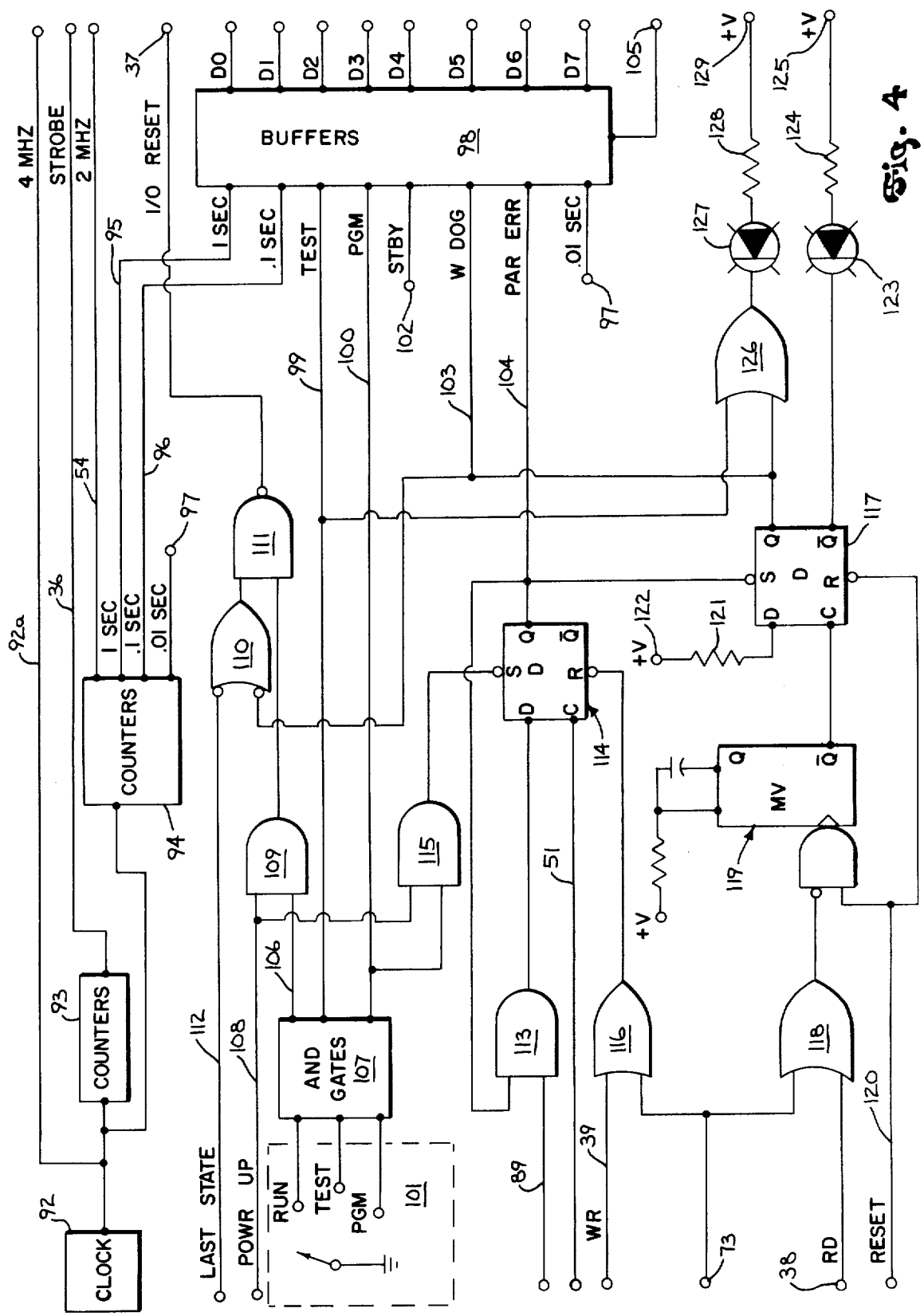
FIG. 4 is an electrical schematic diagram of the timing circuit shown in FIG. 2.

As seen in FIG. 4, the timing circuit 21 includes a clock 92 and two sets of counters 93 and 94. The clock 92 outputs a four-megahertz signal to the microprocessor 20 and to both sets of counters 93 and 94 on a four-megahertz line 92a. The output of the first set of counters 93 is connected to the strobe line 36. The second set of counters 94 has four outputs connected to the two-megahertz line 54, a 1-second time base line 95, a 0.1-second time base line 96 and a 0.01-second time base line 97. The 1-second time base line 95 is connected through a set of output buffers 98 to line D0 in the main data bus 26. Similarly, the 0.1-second time base line 96 and the 0.01-second time base line 97 are connected through the output buffers 98 to data bus lines D1 and D7, respectively. Other lines coupled through the buffers 98 include a TEST line 99 and a PROGRAM line 100 that couple a three-position mode switch 101 to lines DB2 and DB3 of the main data bus 26. A standby battery sensing line 102 is coupled to line D4 of the main data bus 26, and finally, watchdog status line 103 and parity error status line 104 are coupled to lines DB5 and DB6 of the main data bus 26. The buffers 98 are enabled through a status word line 105 originating at the B2 output of the decoder 72 in FIG. 3. When the address "14K" appears on the main address bus 27, the address is decoded by the chip select circuit 28, as explained previously, and eight bits of status data can be read by the microprocessor 20.

The mode switch 101 may be set for RUN, TEST or PROGRAM modes of operation. Lines 106, 99 and 100 corresponding to these three positions are coupled through a set of low true AND gates 107 to the buffers 98 and several other gates. The RUN mode line 106, which is active in the logic high state, is coupled with a power-up sensing line 108 to an AND gate 109. The output of this AND gate 109 is coupled with the output of a low true NAND gate 110 through a high true NAND gate 111 to the I/O reset line 37. The watchdog status line 103 and a line 112 are connected to the inputs of the low true NAND gate 110.

The gates 109-111 condition the state of the I/O reset line 37 as follows. When the processor module 16 is operating in the TEST mode or the PROGRAM mode and power is lost, the "last state" option cannot be selected. The line 112, which is usually connected to a switch to determine its logic state, permits a user to choose between deenergizing the I/O devices (I/O reset) or leaving them in their "last state," before operation is interrupted. The state of the line 112 is also ignored when an error is reported on the watchdog status line 103.

The other circuitry in FIG. 4 monitors watchdog timer errors and parity errors which are reported on the watchdog and parity error status lines 103 and 104. The parity line 89 is coupled through an AND gate 113 to a D input on a D-type flip-flop 114 and the translator PROM enable line 51 is connected to a clock input C on this flip-flop 114. The power-up sensing line 108 and the PROGRAM line 100 are coupled through another AND gate 115 to a set terminal on the flip-flop 114, while the write line 39 and the force error line 73 are coupled through an OR gate 116 to a reset terminal on the flip-flop 114. The Q output of the flip-flop 114 is coupled back through an input of the AND gate 113, is connected to the parity error status line 104 and is connected to a set terminal on a D-type, watchdog status flip-flop 117.

The remaining circuitry pertains to the watchdog timer and includes an OR gate 118 that couples the force error line 73 and the read line 38 to one of the dual clock inputs on a watchdog timer 119. The timer 119 includes a monostable multivibrator and an RC coupling circuit for determining the timing constant. A reset line 120 coming from the microprocessor 20 is connected to the other clock input of the timer 119 and to a reset terminal on the watchdog status flip-flop 117. The D input of the flip-flop 117 is pulled high through a resistor 121 by a source of positive d-c voltage 122 and its clock input C is connected to the Q output of the multivibrator 119. When the multivibrator 119 is clocked by a logic low clock signal, it is set. If allowed to time out without receiving another clock pulse, it becomes reset and the watchdog flip-flop 117 is set. This turns on the watchdog error LED 123, which is connected to the Q output of the watchdog flip-flop 117, and which is supplied by current through a pull-up resistor 124 from a source of positive d-c voltage 125. The Q output of the flip-flop 117 and the TEST line 99 are coupled through an OR gate 126 to a RUN LED 127. This LED 127 is supplied by a positive d-c voltage source 129 through another pull-up resistor 128 and is conducts when the watchdog flip-flop is reset to indicate a satisfactory or "go" condition, and is turned off when the watchdog flip-flop is set.

When the programmable controller is in the run mode it sequentially reads out the control program instructions and executes them. Each control instruction is executed by being mapped to its corresponding macroinstruction interpreter routine, which in turn is comprised of a set of microprocessor machine instructions that direct the elements of the programmable controller to carry out the desired functions. The last control instruction in the user control program 42 is an "END" instruction which maps into the I/O scan routine stored in the ROM 23. In addition to inputting data from sensing devices on the controlled machine 33 and outputting data to the operating devices on the controlled machine 33, the I/O scan routine resets the stack pointer SP to the beginning of the user control program 42. Therefore, the user control program 42 is re-executed continuously until the controller is switched to another mode. A complete scan through the user control program 42 may require a few milliseconds for a short user program or tens of milliseconds for long user programs.

Whereas in prior programmable controllers the user control program 42 is comprised solely of programmable controller-type instructions from a well defined and sometimes limited instruction set, it is the general object of the present invention to enable the user to selectively insert within the control program 42 and execute special purpose routines which are written in the machine language understood by the microprocessor 20. This is accomplished in the preferred embodiment of the invention by a newly defined control macroinstruction (COD) which may appear anywhere in the control program 42 and which maps into a corresponding COD interpreter routine 155 stored in the ROM 23. The COD interpreter routine 155 directs the microprocessor 20 through a series of steps which saves the contents of its internal registers and then jumps to a user program which is written in machine language. When the user machine language routine has been executed, the COD interpreter routine 155 is reentered and it restores the microprocessor registers and reads out the next control program macroinstruction in the user control program 42. In other words, the user can develop a control program 42 using programmable controller language, and in addition, include special routines written in the machine language of the microprocessor 20.

Referring particularly to FIGS. 5–8, each COD macroinstruction includes an 8-bit operation code which is mapped to the COD interpreter routine 155. The COD macroinstruction also includes an 8-bit byte of data which is combined with a constant to form a 16-bit operand address. The 16-operand address points to a memory location in a data table portion 156 of the RAM 24 and this memory location stores a user code number comprised of two BCD digits. Stored immediately thereafter on one line of the RAM 24 are two BCD digits which indicate the number of lines in the data table that are allocated to storing data associated with the user machine language routine. Such data is stored on the memory lines which follow and it includes parameters needed by the program panel 12 to display the COD macroinstruction in rung diagram format.

The COD operation code, the user code number (00–99) and the data table space allocation number (00–99) are entered by the user through the program panel 12. The COD macroinstruction may be treated as an input device in the user control program 42, in which case it determines the condition of a rung in a ladder diagram representation of the control program 42. It may also be treated as an output device in the control program 42, in which case it performs a specific function if the rung of which it is a part has tested true. The program panel 12 automatically assigns space in the data table 156 of the RAM 24 when the user enters the COD operation code and the four BCD digits which comprise the user code number and the data table space allocation number.

The user code number identifies which of a plurality of possible user machine language routines is to be executed. Up to ninety-nine separate routines can be identified with the two available BCD digits. In addition, the most significant of these digits indicates where the user machine language routine is located. More specifically, if this digit is "0," the routine is located in the RAM 24 immediately following the COD macroinstruction with which it is associated. On the other hand, if the most significant BCD digit is not "0," the user machine language routine is located in the user library portion 151 of the ROM 23. It is one of the functions of the COD interpreter routine 155 to locate the user machine language routine identified by the user code number.

Figure 9A:
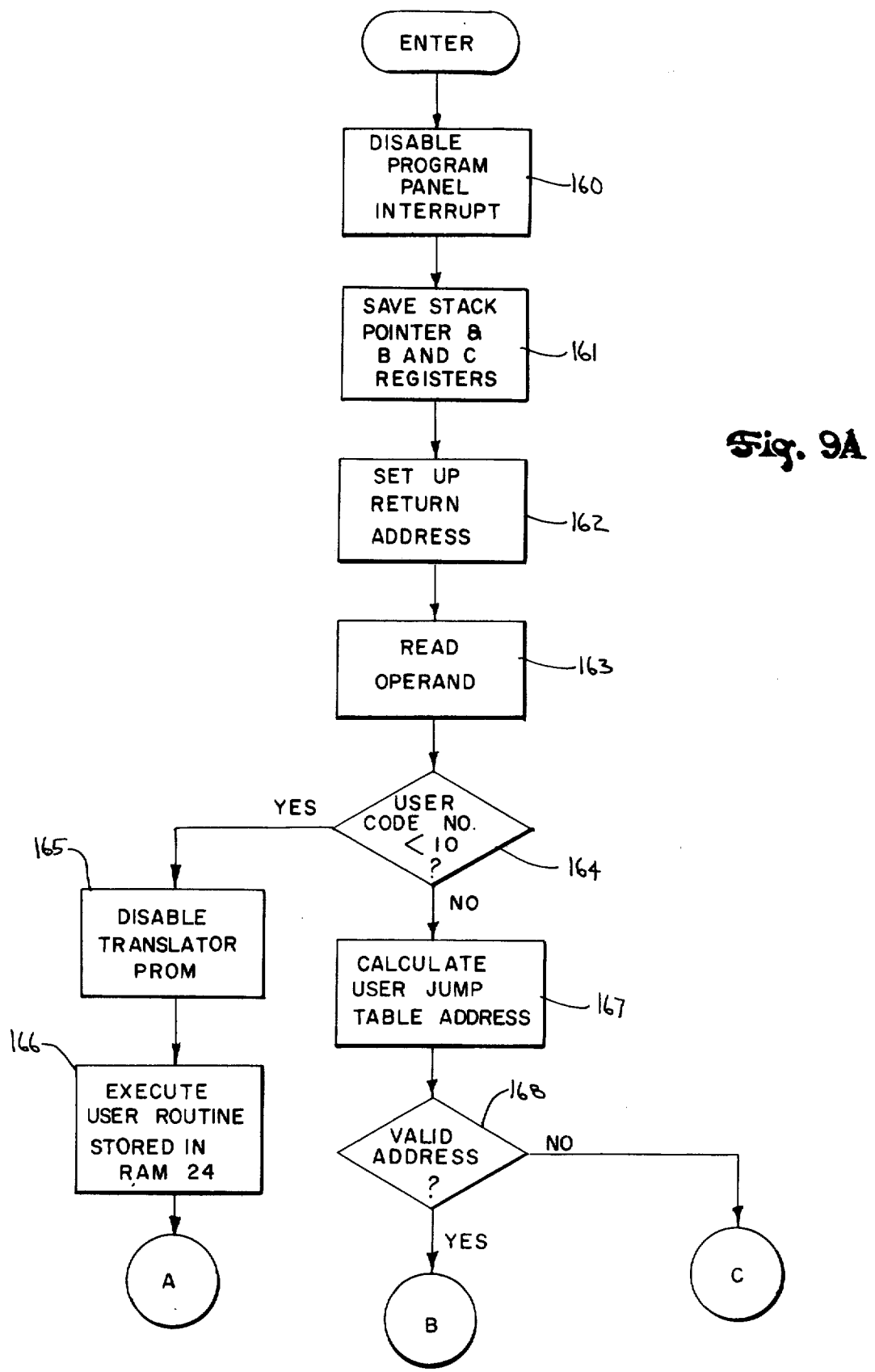
FIGS. 9A and 9B are a flow chart of the COD interpreter routine which forms part of the present invention.

Referring particularly to FIGS. 5 and 9A and the listing of the COD interpreter routine which appears in Appendix A, the first function to be performed each time a COD marocinstruction is executed is to preserve the state of the programmable controller before turning control of it over to the user routine. More specifically, interrupts generated by the program panel interface 22 are disabled as indicated by process block 160 and the contents of microprocessor stack pointer SP, and registers B and C are saved as indicated by process block 161. A return address is then loaded into the stack as indicated by process block 162 so that the user will automatically return to the proper point in the COD interpreter routine following the execution of his machine instruction routine. The COD macroinstruction operand is then read from the data table 156 in the RAM 24 as indicated by process block 163, and as indicated previously, this operand includes the two digit user code number which is then examined as indicated by decision block 164 to determine if it is less than ten. If it is, the user machine language routine is stored in the RAM 24 and the translator PROM 47 must be disabled as indicated at process block 165. This is accomplished by locating the machine language program outside the translated address range (i.e. 3000 to 3FFF) so that none are mistaken for a macroinstruction operation code and converted to meaningless data. The system then jumps to the user routine stored in the RAM 24 as indicated at process block 166.

If the user code number is greater than nine, as determined by decisions block 164, the memory location of the proper user routine must be determined. This is accomplished with the assistance of the user jump table 150 stored in the ROM 23. For each user code number (10-99) there are two associated memory lines in the user jump table 150. These two memory lines have a known, fixed address which is calculated next from the user code number, as indicated by process block 167. The user jump table 150 is accessible to the user and he is responsible for loading into this jump table 150 the 16-bit starting address of his machine language routine. Referring to FIG. 5, for example, the first two lines in the user jump table 150 are associated with the user code number "10" and the second two lines are associated with user code number "11." Each succeeding pair of jump table lines is similarly associated with respective user codes "12" to "99." The user may, therefore, store his machine language routines anywhere in the user library portion 151 of the ROM 23 and enter the starting addresses of those routines in the proper locations in the user jump table 150.

Referring again to FIGS. 9A and 9B, if a valid user jump table address is calculated, as indicated by decision block 168, the system jumps to the indicated user routine and executes the machine instructions therein as indicated by process block 169. Regardless of whether the user routine is in the RAM 24 or the ROM 23, this program has total control over the programmable controller while it is being executed. The complete microprocessor instruction set may be employed to carry out any special functions which either cannot be performed by the programmable controller instruction set or can only be performed in an awkward manner.

It is contemplated that the memory space allocated in the data table 156 will be used to communicate, or transfer, data between the user routine and the control program 42. For example, data from analog sensing devices such as thermometers and pressure sensors may be input by the I/O scan routine and then loaded into this allocated memory space by conventional programmable controller instructions. Conversely, arithmetic results, such as the sine or cosine of an angle calculated by a user routine may be stored in the data table 156 where it may be read and used by the control program 42. As will now be described, the user routine may also affect the status of the Boolean equation, or rung, of which it is a part.

Figure 9B:
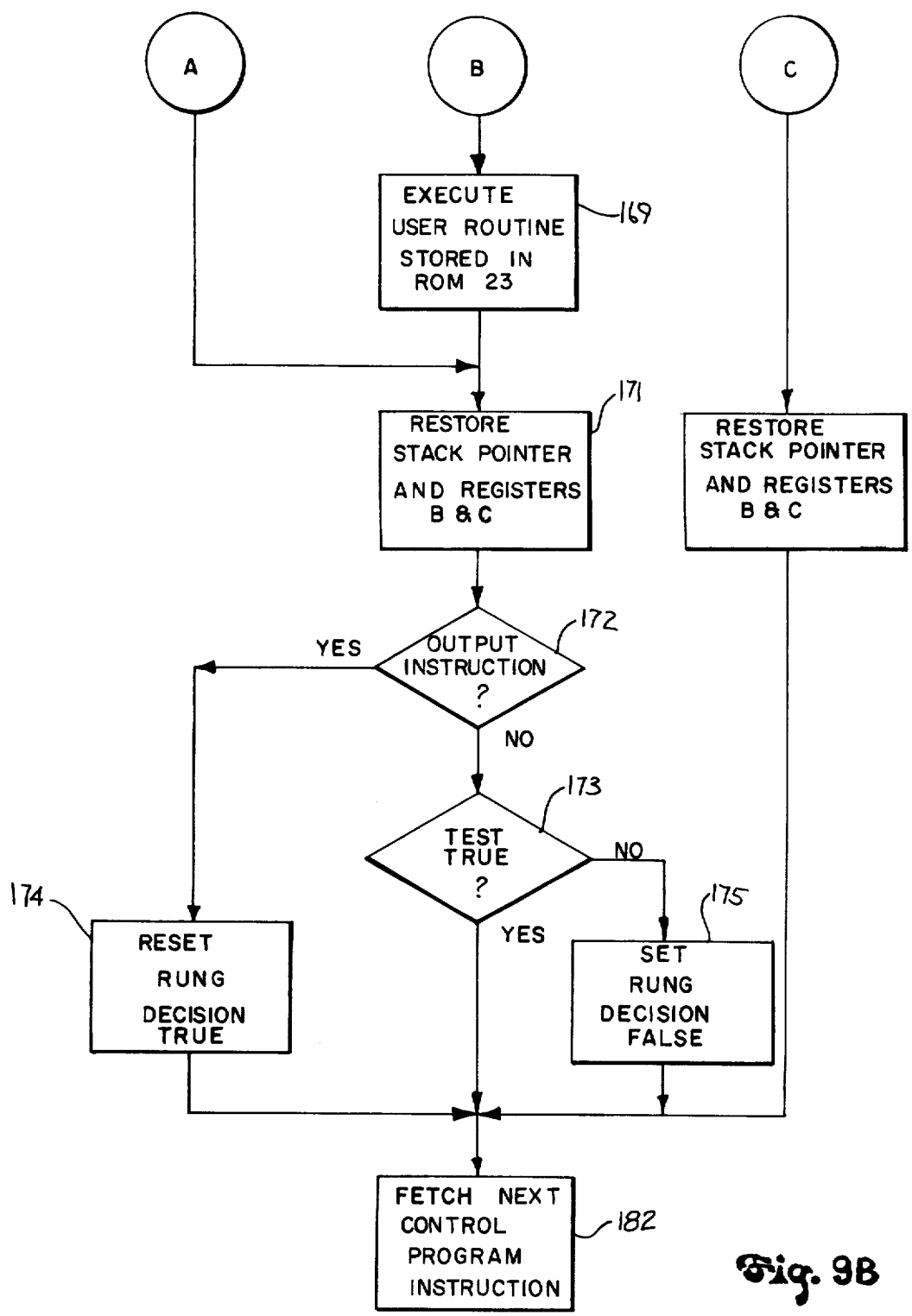

Referring particularly, to FIG. 9B, after the user routine is executed the COD interpreter routine 155 is reentered before returning to the control program 42. First, the microprocessor stack pointer SP, B and C are restored as indicated by process block 171. The B register now contains the current status of the rung defined by the control program 42 and the stack pointer (SP) contains the address of the next control program macroinstruction. In addition, the user is instructed to set bits 0 and 1 in the microprocessor A register during the execution of his user machine language routine if he wants to effect the rung condition. The states of these bits are examined next as indicated by decision blocks 172 and 173 to determine if the rung status is to be changed. If the COD macroinstruction is being treated as an output instruction as determined at decision block 172, the rung status bit is reset true as indicated by process block 174. On the other hand, if the COD macroinstruction is treated as an input instruction in the control program 42, and the condition which the user machine manguage routine tests is false, the rung decision bit stored in the B register is set to false as indicated by process block 175. The system is now ready to resume execution of the control program 42, and accordingly, the next control program macroinstruction is fetched as indicated by process block 182.

It should be apparent that up to ninety-nine separate user routines may be stored and executed during each scan through the control program 42. Indeed, those user routines stored in the user library 151 may be executed any number of times during a single scan through the control program 42 merely by storing COD macroinstructions with the proper user code number at various locations.

Although the present invention enables users and manufacturers alike great flexiblity in the performance of special functions, it also presents some difficulty in managing the scan time of the control program 42. Conventional programmable controller instructions have predictable execution times and, therefore, the total scan time of the control program 42 can easily be determined by adding together the execution times of each control instruction. Such is not the case with COD macroinstructions which will vary considerably in exeuction time depending on the length and nature of the associated user machine language routines. Accoringly, it is one of the features of the present invention that a real time clock is provided to measure the scan time of the user control program 42. The user can therefore easily monitor the effects on scan time of any additions or changes to machine language routines.

Referring to FIG. 11, the 0.01-second time base line 97 connects to the input of a 4-bit binary counter 177 and the four Q outputs on this counter 177 connect to the respective D inputs on a 4-bit latch 178. The Q outputs on the latch 178 in turn connect to leads in the data bus 26 and the count of the counter 177 is read onto the data bus 26 when a logic low voltage is generated on a timer control line 176 by the chip select circuit 28. A control program execution time ranging from 10 milliseconds to 160 milliseconds may thus be determined by reading the contents of the counter 177 once during each scan through the control program 42.

Figure 10:
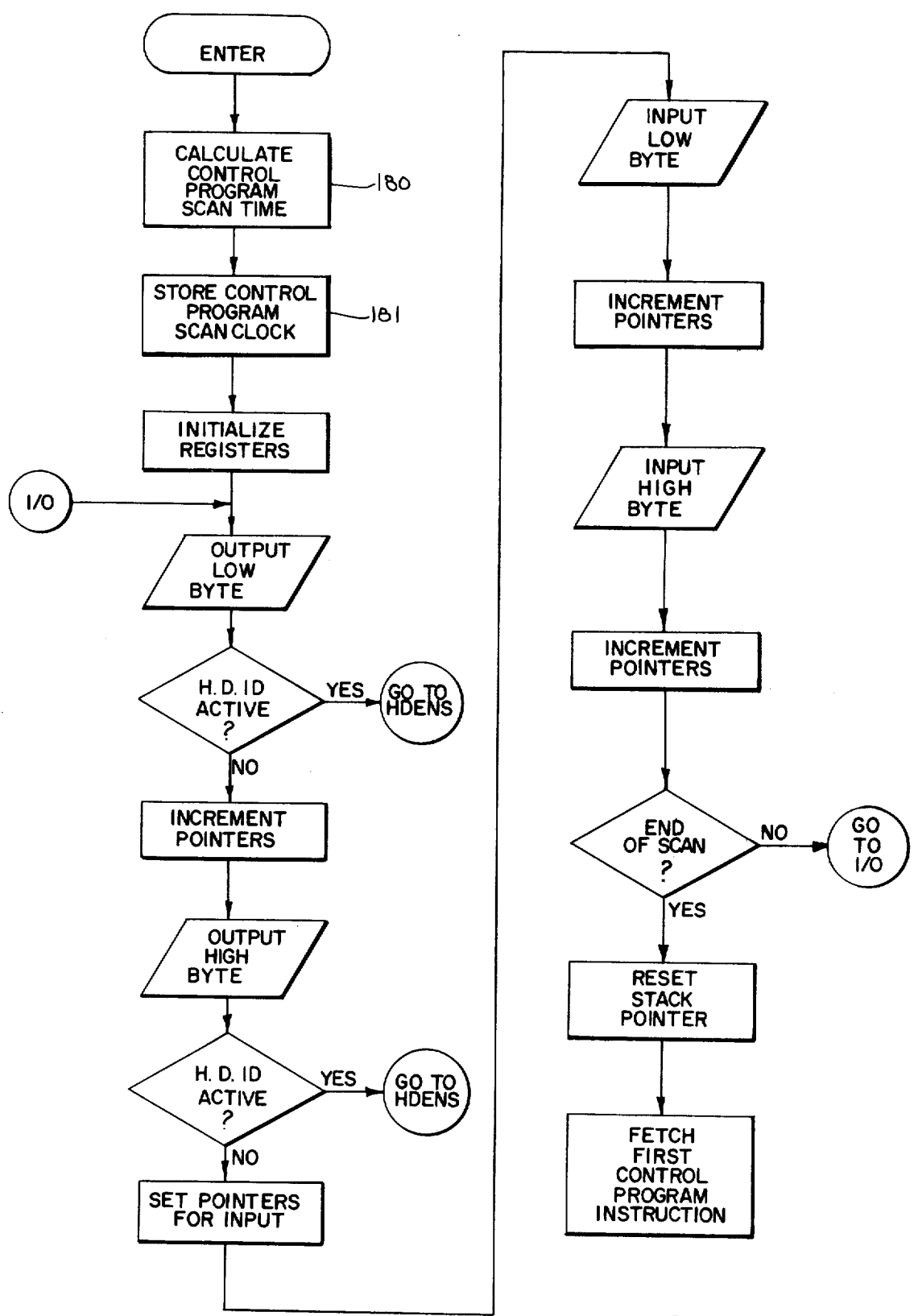
FIG. 10 is a flow chart of the I/O scan routine which forms part of the present invention.

Referring to FIG. 10, this comparison is made as part of the I/O scan routine which is executed at the end of each scan through the control program 42. As indicated above, the END macroinstruction maps to the I/O scan routine and the first function which it performs is to compare the current state of the counter with its previous state. As indicated by process block 180, the difference represents the number of ten millisecond time increments needed to execute the control program 42. This calculated scan time is then stored in a preselected location in the RAM 24 as indicated by process block 181. The program panel 12 may then be employed by the user to examine the contents of this memory location and display it as a control program scan time.

The I/O scan routine is then executed to perform the functions indicated by the remainder of the flow chart in FIG. 10. For a more detailed description of its execution, reference is made to the above cited copending patent application Ser. No. 43,886 entitled "Programmable Controller with High Density I/O Interface."

A programmable controller has been described which may be programmed using two languages. The one language is comprised of a programmable controller-type instruction set and the second language is comprised of a microprocessor machine language instruction set. The programmable controller instruction set includes numerous instructions which define relatively fixed functions to be performed by the programmable controller and it includes a universal instruction which directs the programmable grammable controller to execute a stored routine comprised of microprocessor machine language instructions. It should be apparent that this invention may be embodied in programmable controllers of various architectures and reference is made to the following claims for a definition of the scope of the invention.

APPENDIX A

COD INTERPRETER ROUTINE

| LABEL | OPCD | OPERAND | COMMENT |
|---|---|---|---|
| ; | | | |
| ;*EQUATES* | | | |
| STACK | EQU | 3C40H | ;SCRATCH RAM |
| BSAV | EQU | 3C00H | |
| SSAV | EQU | 3C02H | |
| PROM | EQU | 40H | ;HI BYTE PROM ADDR |
| INTH | EQU | 00H | |
| OPRH | EQU | 20H | |
| ; | | | |
| ; | | | |
| ;*USER CODE MACRO* | | | |
| ;INPUTS TO USER CODE | | | |
| ;SP REG IS MACRO PROGRAM COUNTER | | | |
| ;DE REG POINTS TO DATA TABLE | | | |
| ;B REG HAS CONTROL FLAGS | | | |
| ; | | B0=ACCUM RUNG DECISION 1=TRUE | |
| ; | | B1=INTERNAL BRANCH CONTROL | |
| ; | | B2=INTERNAL BRANCH CONTROL | |
| ; | | B3=INTERNAL BRANCH CONTROL | |
| ; | | B4=MCR ZONE 1=DISABLE OUTPUTS | |
| ; | | B5=P/P CONTROL | |
| ; | | B6=P/P CONTROL | |
| ; | | B7=P/P CONTROL | |
| ;OUTPUTS FROM USER CODE | | | |
| ; | | A0= 0=OUTPUT INSTRUC, RESET RUNG DECISION | |
| ; | | A1= TEST TRUE, 1= DO NOTHING, 0=RESET DEC | |
| ; | | A2= X | |
| ; | | A3= X | |
| ; | | A4= X | |
| ; | | A5= X | |
| ; | | A6= X | |
| ; | | A7= X | X=DON'T CARE |
| ; | | | |
| | ORG | 400H | |
| ;*USER CODED ROUTINE* | | | |
| COD | DI | | ;DISABLE P/P INTERRUPTS |
| ;SAVE ALL NEEDED REGISTERS | | | |
| | LD | (SSAV),SP | ;SAVE STACK POINTER |
| | LD | (BSAV),BC | ;SAVE P/P COMM FLAGS |
| | LD | SP,STACK | ;SET UP STACK |
| | LD | HL,RETN | |
| | PUSH | HL | ;SET UP RET ADDRESS |
| | LD | A,(DE) | ;GET LOW BYTE JMP TARGET |
| | INC | DE | ;SET DATA TBL PNTR TO HI BYTE |
| | SUB | 10H | ;CHK IF USER CODE NO. LESS THAN 10 |
| | JP | C,URAM | ;JMP, USER PROG IN RAM |
| ; | | | |
| | LD | C,0 | |
| COD1 | INC | C | ;CONVERT BCD TO BINARY |
| | DEC | A | |
| | DAA | | |
| | JR | NZ,COD1-$ | |
| ; | | | |
| | LD | H,PROM | |
| | LD | L,C | |
| | LD | A,(HL) | ;GET JMP TABLE ADDRESS |
| | INC | HL | ;INTO HL |
| | LD | H,(HL) | |
| | LD | L,A | |
| | AND | H | |
| | INC | A | ;CHECK ADDR = FFFFH |
| | JR | Z,RET1-$ | ;INVALID (PROM NOT PRESENT) |
| | JP | (HL) | |
| ; | | | |
| URAM | LD | DE,(SSAV) | ;REFERENCED TO 3000H |
| | LD | HL,1000H | ;NO TRANSLATION |
| | XOR | A | |
| | SBC | HL,DE | ;3000-1000 = 2000 |
| | | | ;COMPUTE NEXT MACRO POINTER |
| | LD | E,(HL) | ;GET USER LENGTH |
| | INC | HL | |
| | LD | D,(HL) | ;GET USER LENGTH |

APPENDIX A-continued

COD INTERPRETER ROUTINE

| LABEL | OPCD | OPERAND | COMMENT |
|---|---|---|---|
| | INC | HL | |
| | PUSH | HL | ;SAVE USER START ADDRESS |
| | ADD | HL,DE | ;ADD LENGTH TO START |
| | LD | DE,1000H | ;RET TO TRANSLATION AREA |
| | ADD | HL,DE | ;ADD TRANSLATION BIAS |
| | LD | (SSAV),HL | ;STORE RET MACRO POINTER |
| | POP | HL | ;RESTORE USER START |
| | JP | (HC) | ;JUMP TO USER CODE IN RAM |
| ;*RETURN LOCATION FROM USER CODE* | | | |
| RETN | LD | SP,(SSAV) | ;RESTORE MACRO PROG CNTR |
| | LD | BC,(BSAV) | |
| ;TEST USER RETURNED FLAGS | | | |
| | BIT | 0,A | ;IF OUTPUT, RESET DECISION |
| | JR | NZ,RET2-$ | |
| | BIT | 1,A | ;TEST TRUE, DO NOTHING |
| | JR | NZ,RET1-$ | |
| | RES | 0,B | ;FALSE, RESET DECISION |
| ; | | | |
| ;FETCH NEXT INSTR | | | |
| RET1 | LD | C,INTH | ;RESTORE WORKING REGISTERS |
| | LD | D,OPRH | ;MACRO FETCH |
| | EI | | |
| | POP | HL | |
| | LD | E,L | |
| | LD | L,H | |
| | LD | H,C | |
| | JP | (HL) | |
| ;OUTPUT INSTRUCTION | | | |
| RET2 | LD | A,0F0H | ;RESET RUNG DECISIONS |
| | AND | B | |
| | INC | A | |
| | LD | B,A | |
| | JR | RET1-$ | |

We claim:

1. In a programmable controller having a memory which stores a control program comprised of a plurality of control macroinstructions and a processor which includes a microprocessor, said processor being coupled to said memory and being operable to sequentially read the control macroinstructions from the memory and perform a function indicated by each control macroinstruction by translating it into a set of stored machine instructions which are executed by said microprocessor, the improvement therein comprising:

means coupled to said processor for storing a machine language routine comprised of a unique set of machine instructions, which when executed by said microprocessor carry out a function;

means coupled to said processor for storing an interpreter routine comprised of machine instructions, which when executed by said microprocessor, direct it to:

(a) store the contents of one internal microprocessor register in a selected storage location;
   (b) execute said machine language routine;
   (c) restore the contents of the internal microprocessor register by transferring said contents from said selected storage location; and
   (d) fetch another of said control macroinstructions from said memory; and translator means coupled to said memory and said processor for sensing a selected one control macroinstruction read from said memory and enabling the microprocessor to execute said stored interpreter routine, whereby the processor executes a control program comprised of both control macroinstructions and said selected one control macroinstruction.

2. The programmable controller as recited in claim 1 which includes timer means coupled to said microprocessor and being operable to measure the time required to execute the control program, and visual indication means coupled to the timer means for providing an indication of said execution time.

3. The programmable controller as recited in claim 1 in which the contents of said one microprocessor register indicates the location in said memory of said another control macroinstruction.

4. The programmable controller as recited in claim 1 in which the contents of said one microprocessor register is data which has resulted from the execution of other control macroinstructions in said control program.

5. The programmable controller as recited in claim 1 in which said memory is a random access memory in which data can be written and read.

6. The programmable controller as recited in claim 5 in which said meeans for storing a machine language routine forms part of said random access memory and said means for storing an interpreter routine forms part of said read-only memory.

7. The programmable controller as recited in claim 5 in which said means for storing a machine language routine is a read-only memory.

8. The programmable controller as recited in claim 1 in which said means for storing a machine language routine stores a plurality of such routines each separately associated with a unique one of a plurality of user codes, said one selected control macroinstruction read from said memory includes one of said user codes and said microprocessor operates in response to said stored interpreter routine to select the machine language routine associated with the user code in said one selected control macroinstruction.

9. The programmable controller as recited in claim 8 which includes a jump table coupled to the processor and in which each of said plurality of machine language routines is associated with its user code by a unique address which is stored in said jump table and said microprocessor operates in response to said stored interpreter routine to select the machine language routine corresponding to the user code by reading out its unique address from said jump table.

10. A programmable controller which comprises:
a memory which stores a control program comprised of a plurality of control instructions each having an operation code which defines a specific fixed function to be performed, said memory also storing as part of said control program a universal control instruction having a unique operation code;
processor means coupled to said memory and being operable to sequentially read the instructions in said control program from said memory and perform the functions indicated by their operation codes, said processor means including:
 (a) a microprocessor which executes machine instructions to perform functions;
 (b) means coupled to the microprocessor for storing a plurality of interpreter routines, each comprised of a set of machine instructions, which when executed by the microprocessor, cause it to perform a function indicated by an operation code in one of said control instructions;
 (c) means coupled to the microprocessor for storing a machine language routine comprised of a set of selected machine instructions; and
 (d) translator means coupled to said memory and said microprocessor for selecting one of said interpreter routines for execution by said microprocessor in response to each control instruction operation code read from the memory and being operable to select said machine language routine for execution by said microprocessor in response to the unique operation code in the universal instruction read from the memory;
wherein the functions performed in response to the interpreter routines define a programmable controller instruction set and the functions performed in responses to the machine language routine is defined by the user of the programmable controller.

11. The programmable controller as recited in claim 10 in which a plurality of machine language routines are stored in said machine language routine storing means, said universal control instruction includes a user code which identifies one of said plurality of machine language routines, and wherein said translator means is responsive to the user code to select said one of said plurality of machine language routines for execution by said microprocessor.

* * * * *